United States Patent [19]

Cauchy

[11] 4,403,573
[45] Sep. 13, 1983

[54] WATER HEATING APPARATUS FOR SOLID FUEL FIREBOX

[76] Inventor: Charles J. Cauchy, 935 Lincoln St., Traverse City, Mich. 49684

[21] Appl. No.: 363,338

[22] Filed: Mar. 29, 1982

[51] Int. Cl.³ ............................................. F22B 33/00
[52] U.S. Cl. ................................ 122/20 A; 110/234; 126/132; 237/19
[58] Field of Search ...................... 122/20 A; 126/132; 110/234; 237/19

[56] References Cited

U.S. PATENT DOCUMENTS

| | | | |
|---|---|---|---|
| 1,868,423 | 7/1932 | Moyerhofer | 122/20 A |
| 1,887,205 | 11/1932 | Ireland | 122/20 A |
| 4,360,152 | 11/1982 | Schlatter et al. | 110/234 |
| 4,371,111 | 2/1983 | Pernosky | 237/19 |

Primary Examiner—Edward G. Favors
Assistant Examiner—Steven E. Warner
Attorney, Agent, or Firm—Flynn, Thiel, Boutell & Tanis

[57] ABSTRACT

An exterior wall of the firebox of a wood burning stove or the like fixedly supports in close heat exchanging relation therewith a plurality of aluminum fins comprising plates arranged in close side-by-side, substantially coplanar and parallel relation. A single continuous jointless tube of relatively stiff, heat conductive material is bent in a serpentine shape with elongate substantially parallel legs each fixed to the exterior face of a respective plate. The serpentine tube is in contact with said plates except where bent to extend from the end of one plate to the next. In a preferred embodiment, a cover is fixed with respect to and overlies the fins and serpentine portion of the tube, with the ends of the tube extending outward therefrom for connection through water lines to pump and valve apparatus associated with a tank of water to be heated.

13 Claims, 9 Drawing Figures

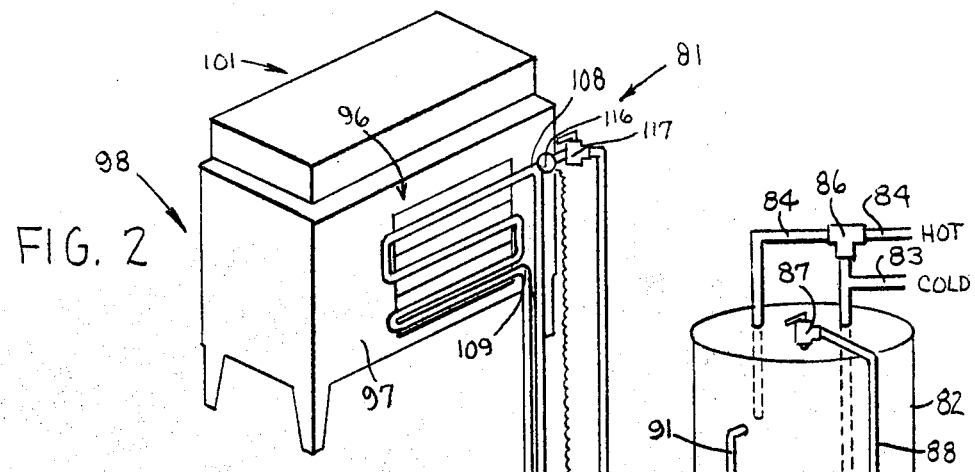
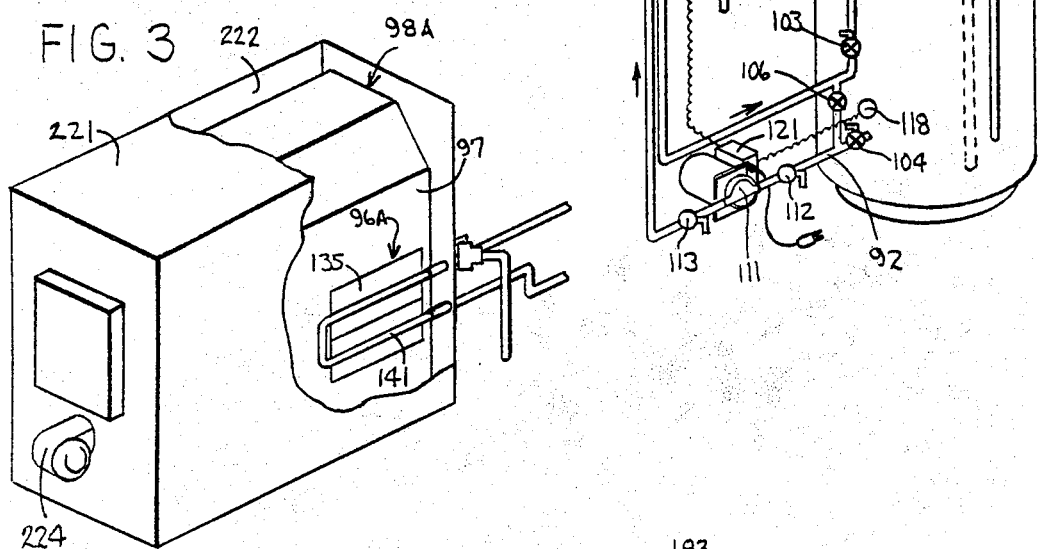
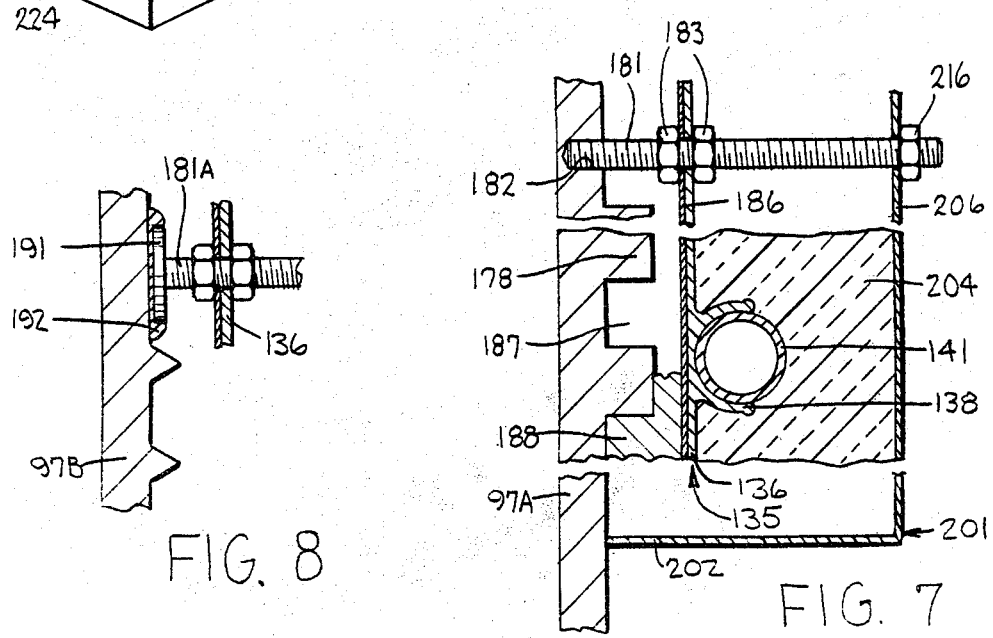

WATER HEATING APPARATUS FOR SOLID FUEL FIREBOX

FIELD OF THE INVENTION

This invention relates to water heating apparatus mounted on the exterior wall of the firebox of a solid fuel burning stove, furnace or the like.

BACKGROUND OF THE INVENTION

A prior heat exchanger 10 is shown in FIG. 1 fitted to the exterior wall 13 of a wood burning stove 11 for heating of water. The prior heat exchanger 10 includes three extruded aluminum fins 15 each comprising an aluminum plate 16 and an integral, central, longitudinally extending clip 18. The clip 18 comprises a parallel pair of ribs 19 protruding from the exterior face of the plate 16. Fins 15 are fixed longitudinally upright in substantially coplanar relation against the side wall 13 of the stove 11 by screws 21 in through-holes in the stove wall.

The heat exchanger 10 of FIG. 1 further includes a water flow ladder 26 comprising substantially horizontal top and bottom manifolds 28 and 29 joined by upstanding, parallel, rigid copper rung tubes 31-33 snap fitted into the clips 18 of corresponding fins 15. The manifolds 28 and 29 each consist of a pair of conventional copper tees 36 and 37 and a corresponding copper elbow 38 connected by short horizontal rigid copper tubes 41 and 42 in series. The fittings 36, 37 and 38 receive the adjacent ends of the rung tubes 31-33 in the order shown in FIG. 1. The connections of the rigid tubes 31-33, 41 and 42 to fittings 36-38 are individually brazed, the high temperatures possible at the surface of the stove 11 making other forms of connection, such as soldering, unsuitable.

In the FIG. 1 structure, the upper and lower manifolds 28 and 29 must be substantially offset from the ends of the fins 15, by a distance S sufficient to allow for the longitudinal extent of the fittings and brazing material extending from the end of the fitting along the exterior of the corresponding rung tube 31-33. To try to avoid unequal flow rates as between the rung tubes 31-33, which may cause underheating in one rung tube and simultaneous overheating (or even steam production) in the next rung tube, the inlet and outlet copper tubes 51 and 52 lead in opposite horizontal directions from the final fittings 36 of the corresponding upper and lower manifolds 28 and 29. Unfortunately, this results in water line connections at opposite ends of the stove and hence usually in exposure of one or the other of inlet and outlet tubes 51 and 52 at an exposed end of the stove, tending to produce an unsightly appearance.

The plates 16 can be made relatively thin, for example 1/16th inch, to minimize material cost without degradation of heat transfer capability or structural strength for mounting of the water flow ladder to the stove. However, conventional copper tube fittings 36-38, even if quite precisely assembled with their axes substantially in a common plane, tend to bear in line or point contact on the surface of the stove to the extent of lifting the end portions of the fin plates 16 out of best heat conductive relation with the stove wall. The fittings have also been found to restrict water flow where joined to the tubes. The prior heat exchanger 10 has been found unnecessarily limited in the temperature rise thereacross and in some instances to thereby disrupt temperature stratification in a domestic hot water storage tank, to the upper and lower ends of which the outlet 51 and inlet 52 connect.

Accordingly, it is an object of this invention to provide an improved water heating apparatus which overcomes disadvantages of the prior apparatus above discussed with respect to FIG. 1.

Other objects and purposes of this invention will be apparent to persons acquainted with apparatus of this general type upon reading the following specification and inspecting the accompanying drawings.

The objects and purposes of the invention are met by providing a solid fuel burning stove, furnace or the like with a single continuous jointless tube of semi-rigid heat conductive metal bent in a serpentine shape incorporating elongated substantially parallel horizontal legs fixed to respective ones of a plurality of horizontal aluminum fins directly opposing the stove or furnace firebox wall, the serpentine tube further having integral bends at the ends of the fins and by which the legs of the serpentine tube are integrally joined in series to permit water to be heated to flow back and forth across the face of the stove. Cover means overlie the fins and serpentine tube to trap heat supplied by the firebox in the region of the fins and tubes.

BRIEF DESCRIPTION OF THE DRAWINGS

FIG. 2 is a schematic pictorial view showing apparatus according to the present invention for heating water by a solid fuel burning stove, of radiant type.

FIG. 3 is a fragment of FIG. 2 showing a modification for heating of water by the firebox of a solid fuel furnace or stove of the type enclosing the firebox in an air heating chamber.

FIG. 7 is a view similar to FIG. 5 but showing a further modification in mounting of the fin and cover with respect to the firebox wall.

FIG. 8 is a view similar to FIG. 7 and showing a modification thereof.

DETAILED DESCRIPTION

Figure 1:
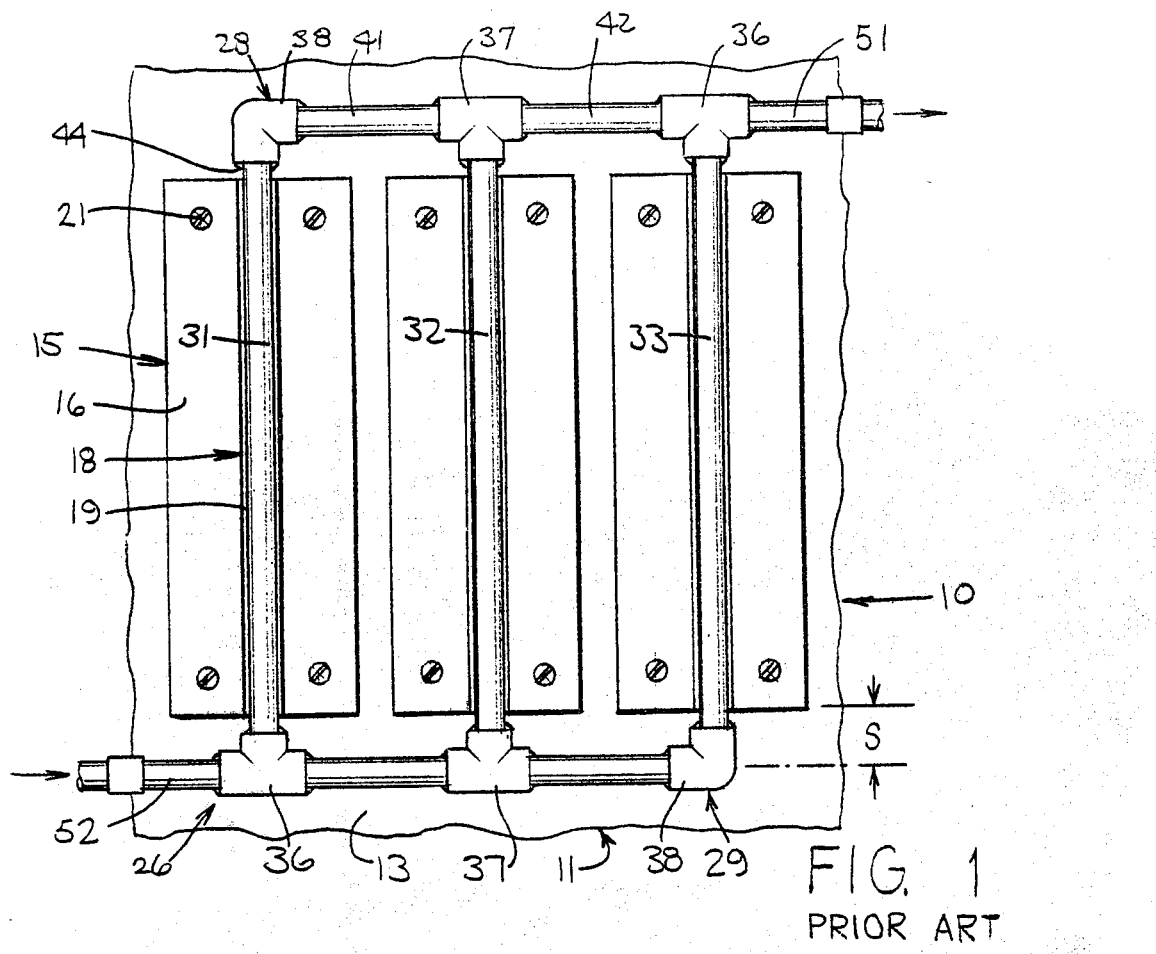
FIG. 1 is a fragmentary elevational view disclosing a prior heat exchanger mounted on the side of a wood stove.

FIG. 2 discloses a water heating circuit embodying the invention, in which water to be heated is stored in a hot water tank 82. The top of the tank has an incoming cold water line 83, an outgoing hot water line 84 and tempering valve 86 interposed therebetween to limit output temperature at 84. The tank 82 is conventionally connected through a normally closed temperature pressure relief valve 87 with a drain line 88. The cold water input pipe terminates near the bottom of the tank and the hot water outlet pipe terminates near the top of the tank (as shown in dotted lines) to assist temperature stratification within the tank caused by the tendency of hot water to rise with respect to cold water.

Placed high and low on the tank are hot water inlet and cool water outlet water lines 91 and 92 leading to a heat exchanger 96 fixed in close opposed relation to the wall 97 of the exposed firebox 98 of a radiant solid fuel stove 101, here for example a household wood stove of conventional type.

In the particular embodiment shown, normally closed, manually openable ball valves 103 and 104 are interposed respectively in the water lines 91 and 92 immediately adjacent the tank 82 to permit disconnection of the tank from the remainder of water lines 91 and 92 without leakage of water from the tank. A normally closed, manually openable gate valve 106 is provided in a shunt connection across the water lines 91 and 92 at points separated from the tank 82 by the valves 103 and 104 and is openable to permit circulation of water through the heat exchanger 96 when the valves 103 and 104 are turned off. From the valves 103 and 106, the line 91 extends to and connects to an outlet tee 108 of heat exchanger 96. From valves 106 and 104, the line 92 extends to an inlet fitting 109 of the heat exchanger 96 and has inserted therein, in series, an electric pump 111 flanked by a pair of hose bibs 112 and 113 for permitting draining of the water heating loop including tank 82, lines 91 and 92 and heat exchanger 96.

In addition, the outlet tee 108 of heat exchanger 96 connects through a temperature sensor 116, which monitors the output temperature of the heat exchanger 96, to a further temperature pressure relief valve 117 which is normally closed but is automatically openable to drain in the event of excessive temperature and/or pressure conditions at the outlet of the heat exchanger 96. A further temperature sensor 118 is provided low on the tank 82 (either on the exterior surface thereof or preferably within the tank) for sensing water temperature in the cooler portion of the tank. The sensors 116 and 118 provide electrical outputs to a conventional temperature differential control 121 (for example of 24-volt type) which turns on the pump when the outlet temperature of the heat exchanger 96 exceeds, by a preselected temperature differential, the temperature in the bottom portion of the tank 82 so as to circulate tank water in the direction indicated by the arrows through the heat exchanger and thereby heat it.

In the preferred heat exchanger 96 of FIG. 2, three aluminum fins 135 (FIG. 4) are preferably of the prior type discussed above with respect to FIG. 1 and are similarly arranged in close side-by-side, substantially parallel relation to each other in close opposed heat exchange relation with the side wall (and/or top wall if desired) of the stove 98.

However, the heat exchanger 96 otherwise departs from prior heat exchanger 15 as follows. A single, continuous, jointless tube 141 (FIG. 3) of semi-rigid, heat conductive metal is bent in a serpentine shape including elongate substantially parallel legs 142-145 (FIG. 4) joined by smoothly rounded integral bend portions, as at 151 and 152. The legs 142-144 are secured in a snap-fit manner in the semi-circular section, elongate clips 138 extruded into the exterior face of the corresponding fins 135-134.

The inlet and outlet ends 153 and 154 of the tube 141 extend beyond the ends of the corresponding fins 135 by a substantial distance as hereafter described. However, the bend portions 151 and 152 lie beyond the ends of the fins 135 by only a minimal distance S1, substantially less than the least possible distance S in FIG. 1, because the bend portions 151 and 152 begin, and the straight legs 142-144 end, directly at the ends of the fins. The bend portions 151 connect legs which are restrained by the clips 138 in adjacent fins 135, and are therefore vertically elongate in correspondence to the vertical separation of the corresponding fins. The length of tubing out of heat conducting engagement with the fins is minimized by providing each of the longer bend portions 151 in the form of a straight segment 161 lying close along the ends of the adjacent pair of fins 135 and connecting with their legs through smoothly rounded, approximately 90° integral bends 162. The bends 162 are of minimum radius consistent with forming of a smoothly rounded full cross section curve in the tube 141. For the nominal hlaf-inch copper tube employed here, the radius, measured to the center line of the tube at the bend 162, is about three-quarter inch.

The fins' elongate legs 142-145 of the tube 141 extend substantially horizontally to provide a sinuous upwardly advancing path from inlet end 153 to output end 154, without upward or downward pockets, so as to avoid vapor blockages and to permit complete draining of the tube 141. In view of this sinuous configuration of tube 141, each successive segment of the flow passing from inlet 153 to outlet 154 flows at the same rate through the same path length and over the same portions of the stove.

An even number (for example two or four) horizontal fins 135 may be stacked up along the side wall of the stove to cause all bent portions to be of the type shown at 151 and still achieve location of both the inlet and outlet 153 and 154 on the same side (here rightward) of the stove wall. However, it will at times be more convenient, in view of the height of the stove wall or other factors, to employ an odd number of fins 135, such as the three in FIG. 4. Then the inlet and outlet tube ends 153 and 154 can still be led to the same side of the stove by means of a short bend portion like that at 152, wherein the above-mentioned short straight section 161 is eliminated and the bends 162 directly follow each other, with one leg, here inlet leg 145, simply extending along the exterior surface of the base plate 136 of the corresponding fin near, but out of contact with, the corresponding clip 138.

In FIGS. 5–8, the tube 141 is supported on the stove by the fins 135, which are fixed to the stove wall 97 by means of their respective plates 136 in ways depending on the character of the stove wall.

Figure 5:
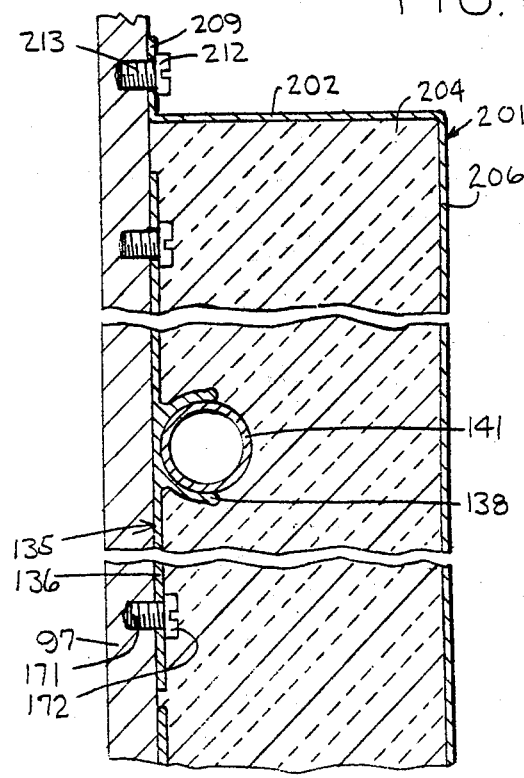
FIG. 5 is an enlarged fragmentary sectional view substantially taken on the line V—V of FIG. 4.
Figure 6:
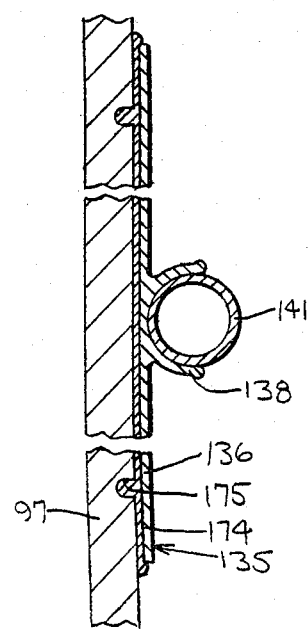
FIG. 6 is a view similar to FIG. 5 but showing a modification in mounting of the fin on the firebox wall.

The attachment means shown in FIGS. 5 and 6 are particularly suited for stove walls having flat smooth exterior surfaces. In the prior apparatus of FIG. 1 the fins 15 were secured to the stove wall by screws threadedly in through-holes in the stove wall. It has now been found that, with typical wood stoves having steel plate or cast iron walls of one-quarter inch or greater thickness, blind recesses can be drilled in the exterior surface of the stove wall, in registry with through-holes in the fin plates 136 and, by using a plurality of very short screws, typically six or eight quarter-inch long screws 172 per fin, the heat exchanger 96 can be reliably attached to the stove wall without breaching same.

Instead of or in addition to the screws 172, Applicant has found that the heat exchanger can be attached to the stove wall by a suitable commercial heat conductive, heat tolerant adhesive 174 (FIG. 6). An advantage is the tendency of the adhesive to fill minor pits or valleys 175 in the surface of the stove wall so as to maintain virtually 100% heat conductive contact between the opposed faces of the fin 135 and stove wall 97.

The FIG. 7 modified mounting arrangement is particularly advantageous for stove walls having a rough or embossed or otherwise uneven exterior surface (e.g. with ridges here shown at 178) which make the FIG. 5 and FIG. 6 mounting arrangements inconvenient or unsatisfactory. In FIG. 7, elongated threaded studs 181 have leftward ends threaded in blind recesses in the stove wall 97A. The studs 181 extend through holes in the plates 136 of the fins 135 to which they are fixedly secured as by nuts 183. The thus rigidly supported fins 135 are preferably spaced not only from the depressed portions of the stove wall surface but also from the ridges therein, as shown, and their plates 136 on the interior face opposed to the stove wall 97A are provided with a heat absorbing surface, for example a flat black anodized coating, for receiving heat by radiation from the stove wall, as well as by convection and conduction through the air gap 187 therebetween. It is further contemplated, particularly where the gap 187 is relatively narrow, that same may be filled with a heat conductive filler material, as indicated fragmentarily at 188, for example the adhesive 174 in FIG. 6.

Instead of threadedly engaging the stove wall as in FIG. 7, a modified stud 181A (FIG. 8) is provided with an enlarged flat head 191 securable by a heat resistant adhesive at 192 to the exterior face of the stove wall 97B. This alternative is suitable where the stove wall exterior face has small areas which are flat or of only moderate roughness and of proper size and location to receive the head 191. The FIG. 8 approach avoids the need to bore blind recesses in the stove wall and hence makes for more rapid installation than in FIG. 7.

Figure 4:
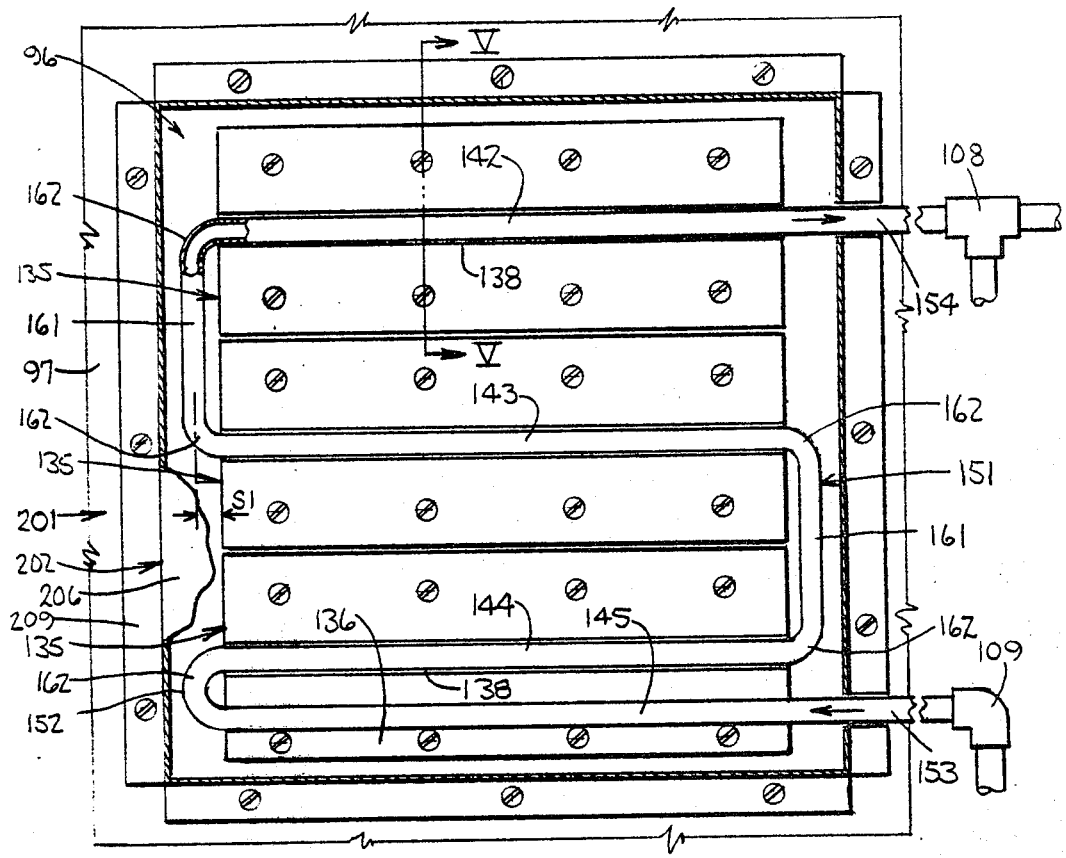
FIG. 4 is a partially broken enlarged fragment of FIG. 2 showing a heat exchanger in accord with the invention as applied to the wall of a solid fuel firebox.

With the heat exchanger 96 applied to a radiant stove as in FIG. 2, wherein the exterior wall of the stove is also the exterior wall of the firebox, the inventive apparatus preferably includes a substantially rectilinear, sheet metal cover 201 (FIGS. 4, 5 and 7) which is shaped as a relatively shallow pan and is fixed to the stove wall to cover, with some degree of clearance, the heat exchanger 96. As seen in FIG. 4, the cover 201 has four side walls 202 arranged in close spaced relation from the heat exchanger 96. One side wall 202 has notches 203 through which pass the tube ends 153 and 154. The space from the cover back 206 and the heat exchanger fins 135 and tube 141 is preferably filled with heat resistant insulation such as conventional fiberglass batting 204 (FIG. 5) to minimize heat loss exteriorly from the fins 135 and tube 141 out through the cover 201.

Where the exterior stove wall surface is relatively flat and smooth, the cover 201 is preferably attached thereto by means of flanges 209 (FIGS. 4 and 5) on at least two opposite sides 202 of the cover, secured by short self-tapping screws 212 threaded into blind recesses 213 in the stove wall 97. This cover mounting is particularly suitable for the FIG. 5 embodiment since it mounts the cover in the same manner in which the fins are mounted to the stove wall, but is also suitable for the FIG. 6 embodiment.

In the embodiments of FIGS. 7 and 8 it is more convenient to extend the studs 181 sufficiently far from the stove wall 97A to pass through holes in the back 206, so that nuts 216 releasably press the cover 201 against the stove wall 97A.

The foregoing description has been in terms of a radiant stove, in which the wall of the firebox is normally exposed. However, the invention is also applicable to a solid fuel burning furnace or covered air heating stove of the type shown in FIG. 3 wherein the firebox 98A is loosely covered with an outer shell 221 loosely spaced by a relatively narrow air flow chamber 222 from the surface of the firebox 98A. Typically, a blower 224 or the like is actuable to circulate air to be heated through the air flow chamber 222. In the example shown in FIG. 3, a heat exchanger 96A may be fixed to the exterior wall 97A of the firebox 98A in the manner above discussed with respect to heat exchanger 96 in FIGS. 4–8. In FIG. 3, the particular heat exchanger 96A employed utilizes two, rather than three, fins 135 and the length of sinuous tube 141 is reduced as are the number of bends therein.

Figure 9:
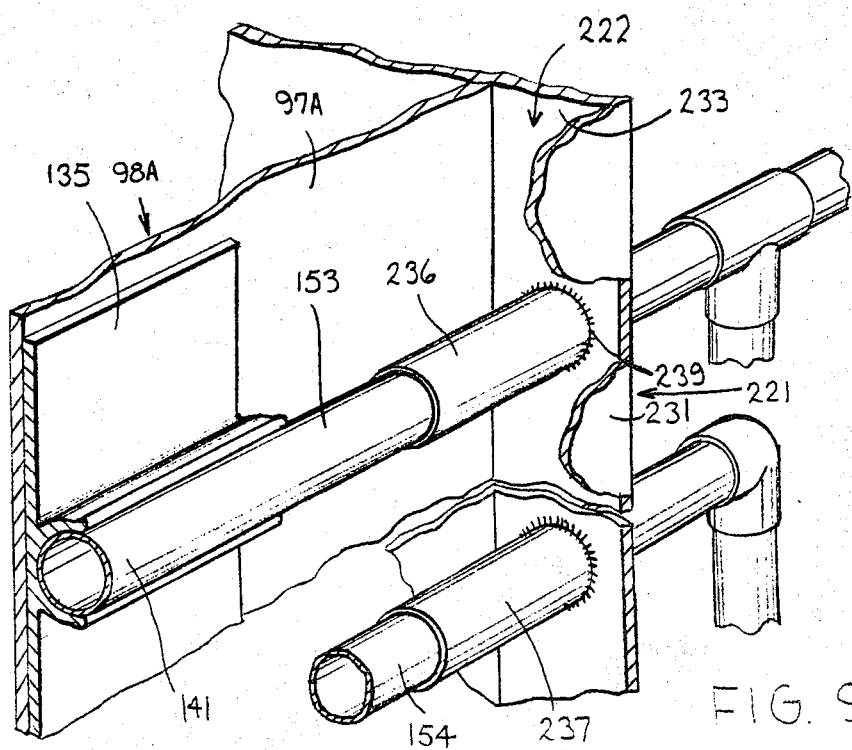
FIG. 9 is an enlarged fragmentary partially broken fragment of the apparatus of FIG. 3 showing a modified mounting for the heat exchanger within the air chamber surrounding the firebox of the stove or furnace.

A heat exchanger, such as heat exchanger 96 or 96A, may be mounted between the opposed walls of the FIG. 3 firebox 98A and shell 221 in a different manner, namely as shown in FIG. 9, wherein the ends 153 and 154 of tube 141 are the parts of the heat exchanger employed to fix the heat exchanger to the stove, rather than employing the fins 135 for mounting as in FIGS. 5–8. In FIG. 9 the shell 221 includes a wall 231 parallel to and spaced from the firebox wall 97 by a portion of air flow chamber 222. The shell 221 further includes a wall 233 which extends perpendicularly between the firebox and shell walls 97A and 231. The ends 153 and 154 of the tube 141 exit from the air chamber 222 through snug holes (not shown) in the wall 233. These holes are extended by bushings 236 and 237 fixed, preferably by welding, at 239 to the interior face of wall 233. The bushings 236 and 237 snugly receive therethrough the tube ends 153 and 154 and hold the tube 141 and fins 135 fixedly in place within the air chamber 222, preferably with the interior face of the fins 135 snugly abutting the stove wall 97A, and being spaced from the shell wall 231. In this instance, the fins 235 and tube 141 are heated, in part, by circulation of air through the air flow chamber 222 by blower 224. The tube ends 153 and 154 may be held in the desired location axially in the bushings 236 and 237 by any convenient means, such as a friction fit, or by means of a heat resistant sealant or adhesive therebetween to resist loss of air from the chamber 222 along the tube ends 153 and 154. It is also contemplated that the fins 135 may be somewhat spaced from the stove wall 97A to be heated entirely by circulation of air through chamber 222.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination with a solid fuel burning stove, furnace or the like, of the kind having a firebox in which the fuel is burned, which firebox includes a substantially flat exterior wall heated from within by said burning:
   a water tank;
   first and second water lines connected to said tank and including respective normally open first and second manual valves adjacent said tank;
   a normally closed third manual valve connected between said first and second manual valves as a shunt across said first and second water lines;
   means including a pump flanked by a pair of normally closed manual drain valves inserted in said second water line and separated from said tank by said second and third manual valves, said first and second water lines having ends remote from said water tank and leading to said firebox;

a heat conductor array comprising a plurality of aluminum fins each having an elongate substantially rectangular plate with one face fixed with respect to said exterior wall of said firebox in close heat exchanging relation, said plates being fixed in close side-by-side, substantially parallel relation to each other;

a single continuous, jointless tube of semi-rigid, heat conductive metal bent in a serpentine shape with elongate substantially parallel legs each fixed to the opposite face of respective said plates on the central length axes of said plates and with smoothly rounded integral bends at the ends of said plates and joining the adjacent ends of said adjacent legs, the opposite ends of said serpentine tube extending in the same direction from the array of plates substantially in parallel with each other, one said tube end being connected by a fitting to said second waterline remote end, the other tube end being connected by a fitting to the first waterline remote end and through a first temperature sensor to a temperature-pressure relief valve openable to a drain outlet;

a second temperature sensor associated with said tank for sensing the temperature of water therein, said pump having a controller responsive to a preselected temperature drop between said temperatures sensed by said first and second temperature sensors, respectively, for operating said pump to circulate water from said tank through said serpentine tube and back through said tank, such that said firebox heats water in said tank.

2. The apparatus of claim 1 in which said tube includes a relatively short straight segment lying close to but outboard of the ends of an adjacent pair of said plates, said straight segment of said tube being perpendicular to the length axes of said legs and said plates and connecting adjacent bends of said tube in continuous jointless relation, the length axes of said fins and legs lying substantially horizontally one above the other, said exterior wall being a side wall of said firebox, said tube ends extending from said fin array at one end of said firebox.

3. The apparatus of claim 2 in which said array comprises three fins stacked edge to edge above each other and covering a substantial fraction of the exterior surface of one side wall of said stove, said other tube end being uppermost, said tube extending horizontally from said other tube end along the central axis of the topmost plate, then downward through a said 90° bend, straight section and further 90° bend, then extending in a reverse horizontal direction through a second leg centered on the middle fin to the end thereof then down through a further 90° bend, straight section and 90° bend to a third leg extending horizontally in the first-mentioned direction along the central portion of the bottommost fin to a point beyond the end of the latter and thence through a pair of closely adjacent 90° bends into a fourth leg of the tube extending horizontally in the reverse direction along but not attached to the surface of the third and bottom fin and adjacent said third leg of the tube, to terminate at said fitting on said one tube end.

4. The apparatus of claim 2 in which said firebox is the firebox of a solid fuel furnace and is enclosed by a surrounding housing defining an air circulation chamber therebetween, said array comprising plural fins arranged one above the other in substantially coplanar fashion against one side wall of said furnace firebox, said tube being bent and comprising an upper leg extending from said other tube end along the central length axis of the upper fin, then down through a 90° bend, straight segment and further 90° bend to a further leg of said tube which extends horizontally in a reverse direction along the center of a second fin, and ultimately to terminate in said one end of said tube.

5. The apparatus of claim 2 in which said firebox exterior wall is provided with blind exteriorly facing recesses, and including self-tapping screws extending through holes in said plates to anchor said plates flush against said firebox exterior wall.

6. The apparatus of claim 2 including an adhesive layer interposed between said plates and said firebox exterior wall for fixing said plates thereto.

7. The apparatus of claim 2 in which said firebox exterior wall has a plurality of exteriorly facing blind recesses therein, threaded elements in the form of studs threaded into said recesses and extending exteriorly from said firebox exterior wall, said plates having holes through which said studs extend and nut means threaded on said studs and fixedly locating said plates thereon so as to fix said fins with respect to said firebox exterior wall.

8. The apparatus of claim 2 including threaded elements in the form of bolts having radially enlarged heads fixed by adhesive bonding to the firebox exterior wall and having threaded shanks extending from said firebox exterior wall through holes in said plates, and including nuts fixedly securing said plates to said bolts.

9. The apparatus of claim 7 or claim 8 in which said firebox has an irregular exterior surface, said fins being spaced from at least portions of the surface of said firebox exterior wall by said threaded elements, said plates having on their one face oriented toward said firebox a heat absorbing coating for transmission of heat from said firebox exterior wall to said fins.

10. The apparatus of claim 2 including a substantially rectilinear boxlike cover of heat resistant material loosely covering said fins and serpentine tube, said cover having outlet notches through which the ends of said tube extend, said cover having side walls for bearing against said firebox exterior wall, said cover having a back wall generally parallel to said firebox exterior wall and covering said fins and the corresponding portion of said serpentine tube in outward spaced relation therefrom, and including means within the cover for reducing heat loss outward through said cover from said fins and serpentine tube.

11. The apparatus of claim 10 including elongate threaded elements fixed to and extending from said firebox wall, extending through and fixed to said plates, and extending therebeyond through said cover, with nuts fixing said cover thereto.

12. The apparatus of claim 2 in which said furnace, stove or the like includes an outer shell spaced by a relatively narrow air flow chamber from said firebox exterior wall, said shell including an end wall extending substantially perpendicular to the plane of said firebox exterior wall, said end wall having a pair of hollow cylindrical bushing members welded thereto and defining respective openings through said end wall and being spaced to receive the ends of said serpentine tube longitudinally therethrough in snug fitting relation to avoid significant leakage of air between said air chamber and the exterior where said tube ends pass through said bushings, said plates being free of attachment direct to said exterior stove wall, said tube ends being fixedly supported on said bushings and in turn fixedly supporting said fins within said air flow chamber for heating of said fins and serpentine tube by air heated in said air flow chamber by said firebox exterior wall.

13. A stove, furnace or the like, of the kind having a firebox in which fuel is burned, which firebox includes a substantially flat exterior wall heated from within by said burning:

a heat conductor array comprising aluminum fins each having an elongate substantially rectangular plate with one face fixed with respect to said exterior wall of said firebox in close heat exchanging relation, said plates being fixed in close side-by-side, substantially coplanar and parallel relation to each other;

a single continuous, jointless tube of semi-rigid, heat conductive metal bent in a serpentine shape with elongate substantially parallel legs each fixed to the opposite face of a respective said plate, said legs extending along the central length axes of said plates and with smoothly rounded integral bends at the ends of said plates and joining the adjacent ends of said adjacent legs, said tube including a relatively short straight segment lying close to the ends of an adjacent pair of said plates, said straight segment of said tube being perpendicular to the length axes of said legs and said plates and connecting adjacent bends to said tube in continuous jointless relation, the length axes of said fins and legs lying substantially horizontally one above the other, the opposite ends of said serpentine tube extending in the same direction from the array of plates substantially in parallel with each other, the two ends of said tube extending from the corresponding ends of their corresponding fins, said exterior wall being a side wall of said firebox, said tube ends extending from said fin array one above the other at the same end of said firebox;

three said fins being stacked edge to edge above each other and covering a substantial fraction of the exterior surface of one side wall of said stove, said tube extending horizontally from the upper end thereof horizontally in one direction along the central axis of the topmost plate, then down through a said 90° bend and straight section and further 90° bend, then extending in a reverse horizontal direction through a second leg centered on the middle fin to the end thereof, then down through another said 90° bend and straight section and further 90° bend to a third leg extending horizontally in said one direction along the central portion of the bottommost fin, then through a pair of contiguous 90° bends into a fourth leg of the tube extending generally horizontally in said reverse direction across, but without attachment to, the surface of the third fin, adjacent said third leg of the tube, to the lower tube end;

a substantially rectilinear boxlike cover of heat resistant material loosely covering said fins and serpentine tube, said cover having sides and a back, one side having outlet notches through which the ends of said tube extend, said cover sides bearing against said firebox exterior wall, said cover back being generally parallel to said firebox exterior wall and covering said fins and the corresponding portion of said serpentine tube in outward spaced relation therefrom, insulating means within the cover for reducing heat loss outward through said cover from said fins and serpentine tube, and fastening means for fixing said cover with respect to said fins and stove.

* * * * *

UNITED STATES PATENT AND TRADEMARK OFFICE
CERTIFICATE OF CORRECTION

PATENT NO. : 4 403 573
DATED : September 13, 1983
INVENTOR(S) : Charles J. Cauchy It is certified that error appears in the above—identified patent and that said Letters Patent is hereby corrected as shown below:

Column 9, line 31; change "to" to ---of---.

Signed and Sealed this

Third Day of January 1984

[SEAL]

Attest:

GERALD J. MOSSINGHOFF

Attesting Officer     Commissioner of Patents and Trademarks